United States Patent
Egedal et al.

(10) Patent No.: US 8,033,788 B2
(45) Date of Patent: Oct. 11, 2011

(54) METHOD FOR DETERMINING FATIGUE LOAD OF A WIND TURBINE AND FOR FATIGUE LOAD CONTROL, AND WIND TURBINES THEREFOR

(75) Inventors: Per Egedal, Herning (DK); Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 473 days.

(21) Appl. No.: 12/350,357

(22) Filed: Jan. 8, 2009

(65) Prior Publication Data

US 2009/0180875 A1    Jul. 16, 2009

Related U.S. Application Data

(60) Provisional application No. 61/020,209, filed on Jan. 10, 2008.

(51) Int. Cl.
| | |
|---|---|
| *B63H 3/00* | (2006.01) |
| *B64C 11/00* | (2006.01) |
| *B64C 27/00* | (2006.01) |
| *F03B 7/00* | (2006.01) |
| *G01L 1/00* | (2006.01) |
| *G01L 3/00* | (2006.01) |
| *G01L 5/00* | (2006.01) |

(52) U.S. Cl. ............... 416/43; 416/61; 702/42
(58) Field of Classification Search ............ 416/43, 416/61; 702/42

See application file for complete search history.

(56) References Cited

U.S. PATENT DOCUMENTS

| | | | |
|---|---|---|---|
| 4,297,076 A | 10/1981 | Donham et al. | |
| 4,339,666 A | 7/1982 | Patrick et al. | |
| 5,140,170 A * | 8/1992 | Henderson | 290/44 |
| 5,141,391 A * | 8/1992 | Acton et al. | 415/119 |
| 6,361,275 B1 | 3/2002 | Wobben | |
| 2002/0047275 A1 | 4/2002 | Wobben | |
| 2004/0151577 A1 | 8/2004 | Pierce et al. | |
| 2006/0273595 A1 * | 12/2006 | Avagliano et al. | 290/44 |
| 2007/0229248 A1 * | 10/2007 | Mott et al. | 340/522 |

FOREIGN PATENT DOCUMENTS

| | | |
|---|---|---|
| EP | 1674724 A2 | 6/2006 |
| GB | 2067247 A | 7/1981 |

* cited by examiner

*Primary Examiner* — David Zarneke (57) ABSTRACT

A method of determining fatigue load of at least one operative wind turbine, comprising: providing a transfer function that associates an obtained at least one measurement value of a first sensor to an obtained at least one measurement value of a second sensor the at least one measurement value of the first sensor and the at least one measurement value of the second sensor being obtained by use of a reference wind turbine at which the first sensor and the second sensor are located; obtaining at least one measurement value of a third sensor, wherein the third sensor is located at the at least one operative wind turbine, and wherein the third sensor corresponds in type and position to the first sensor at the reference wind turbine; calculating at least one transfer function value corresponding to the obtained at least one measurement value of the third sensor by use of the provided transfer function; calculating the fatigue load of the at least one operative wind turbine based on the calculated transfer function value.

15 Claims, 4 Drawing Sheets

METHOD FOR DETERMINING FATIGUE LOAD OF A WIND TURBINE AND FOR FATIGUE LOAD CONTROL, AND WIND TURBINES THEREFOR

CROSS REFERENCE TO RELATED APPLICATIONS

This application claims the benefits of Provisional application No. 61/020,209 filed Jan. 10, 2008 and is incorporated by reference herein in its entirety.

FIELD OF INVENTION

This invention relates to a method of determining fatigue load of a wind turbine, and a method of controlling a wind turbine, a wind turbine, and a reference wind turbine therefor.

BACKGROUND OF THE INVENTION

In order to reduce technical effort in wind turbine manufacturing, it is desired to reduce safety redundancies in the design of wind turbine supporting structures.

Limits for reducing such safety redundancies are usually defined by the mechanical stress that affects the wind turbine. A known approach is thus to design the wind turbine structures so as just to withstand the cumulative fatigue loading on the structure throughout its design life when operating under a given set of environmental conditions.

Wind turbines are often operated under conditions in which the fatigue loads are occasionally of such magnitude that if the loads were to be maintained at that magnitude, the fatigue capacity of the wind turbine structure would be exceeded during its entire design lifetime. To meet such situations, it is known in the state of the art to implement load monitoring sensors and to shut down the wind turbine in case of high loads or even overloading.

However, shutting down a wind turbine in such a manner produces undesired times of unavailability, in which the wind turbine does not produce energy. Further, the shutdown process may by itself add to the overall fatigue damage of the wind turbine.

European patent application publication EP 1 674 724 describes a method wherein the position of components of the wind turbine is determined with respect to a fixed reference location with one or more sensors coupled with the wind turbine component. Here, fatigue load analysis is performed based on output signals from the one or more sensors. However, for this method, a plurality of accelerometers is required, which further need to be located in a specific geometrical pattern, for example a number of three accelerometers that are oriented in an orthogonal manner. Further, the solution proposed therein requires complex mathematical processing of the accelerometer signals by performing a double integration in order to provide an approximate displacement figure.

An alternative solution that may avoid the complex calculations of the solution described above is proposed in U.S. Pat. No. 4,297,076. This patent describes a wind turbine that comprises load measurement means (strain gauges) which are coupled to the wind turbine blades for measuring the bending moment on said blades and for providing an output signal representative thereof. Further, it provides adjustment means which are coupled to said load measurement means for varying the pitch of said tip portions in response to said output signal.

In a similar manner, the system presented in United States patent application publication US 2002/0047275 A1 comprises a rotor hub which is provided with measurement means for the mechanical loading at the hub.

However, the use of strain gauges for directly measuring the mechanical loads acting on the wind turbine suffer from the disadvantage that strain gauges, such as bonded or welded strain gauges, require expertise to install and maintain and moreover have only a comparatively short technical lifespan.

Various alternative approaches are known from the state of the art:

In United States patent application publication US 2004/0151577 A1, a wind turbine is described which comprises one or more sensors connected to directly detect deflection of a main shaft flange of the wind turbine from one or more predetermined positions. Further, a signal is generated that corresponds to the detected deflection, and a control circuit is coupled with the sensors to receive the signals and to mitigate a load causing the deflection of the main shaft flange in response to the signals. However, this method has the disadvantage that shaft deflections may be caused by numerous factors, including internal bearing play and flexibility. Further, the correlation between loading and deflection will generally be suboptimal.

United States patent U.S. Pat. No. 4,339,666 describes a blade pitch angle control for a wind turbine generator that utilizes means providing a turbulence factor signal that is indicative of the degree to which the present instantaneous wind velocity may exceed a present average wind velocity. It further proposes signal processing means for providing a load capacity signal as a function of the turbulence measurement. However, the wind speed measurement is taken at a certain point, such as at hub height, so that the point at which the measurement is taken is not indicative of the wind speed that actually acts at the rotor disk.

The system proposed in the aforementioned patent may be combined with the system of UK patent application GB 2 067 247 A, which describes a method in which the instantaneous wind speed is measured at the blade surfaces and where this measurement is used to reduce loads. These methods however do not take into account accumulated fatigue data and will therefore perform more load regulation over the lifetime of the wind turbine than may be needed when talking into account "unused" fatigue capacity.

SUMMARY OF INVENTION

It is thus an object of the present invention to provide a method for determining fatigue loads of a wind turbine that reduces the amount of sensors that are required while increasing the robustness of the sensor systems, and, at the same time, reduces calculation complexity as compared to the discussed systems of the state of the art.

The invention according to the claims proposes a method of determining fatigue load of at least one operative wind turbine, comprising the steps of:
  providing a transfer function that associates an obtained at least one measurement value of a first sensor to an obtained at least one measurement value of a second sensor the at least one measurement value of the first sensor and the at least one measurement value of the second sensor being obtained by use of a reference wind turbine at which the first sensor and the second sensor are located;
  obtaining at least one measurement value of a third sensor, wherein the third sensor is located at the at least one operative wind turbine, and wherein the third sensor corresponds in type and position to the first sensor at the reference wind turbine;

calculating at least one transfer function value corresponding to the obtained at least one measurement value of the third sensor by use of the provided transfer function;

calculating the fatigue load of the at least one operative wind turbine based on the calculated transfer function value.

In the inventive method, the transfer function allows for correctly associating the obtained measurement values of the first sensor to the obtained measurement values of the second sensor. It thus enables to feed further measurement values derived from the first sensors, or equivalent sensors, into the transfer function and obtain function values that correspond to measurement values that would have been measured at the second sensors. It is thus possible to calculate, or at least approximate, values corresponding to the second sensors with the help of the transfer function and the actually measured values from the first or equivalent sensors instead of actually performing measurements at the second set of sensors once the transfer function is established.

The invention makes use of this technical effect by using a transfer function derived from a reference wind turbine at which the mentioned first sensors and the mentioned second sensors are located at and at which also the calculation of the transfer function may take place. Such a reference wind turbine does not need to be part of a wind park of operative wind turbines. In fact, it can be far away from the operative wind turbine and does not even need to exist at the same time as the operative wind turbine.

As opposed to the reference wind turbine, the operative wind turbines only comprise a reduced total amount of sensors as compared to the reference wind turbine, namely only a third sensor or a set of third sensors that correspond to the first sensor or set of sensors of the reference wind turbine, preferably in number, type, and position. Measurement values at the operative wind turbine are thus obtained by said third sensor or set of sensors. Hence, the technical cost and complexity of a full sensor equipment is centralized at one or only a small number of reference wind turbines, while a comparatively large number of operative wind turbines benefit from a reduced number and complexity of sensors.

By calculating transfer function values that are output by the transfer function on the basis of the measurement values obtained from the third senor or third set of sensors, the values that would have been acquired from additional second set of sensors (having been dispensed with at the operative wind turbine) are instead calculated in a cost-effective manner. In cases where the first and third sensors are, e.g., accelerometers and the second sensor is, e.g., a strain gauge sensor, the transfer function values calculated from acceleration values derived from the first or third sensor correspondingly are values representing strain. In this case, the transfer function provides a correlation between strains representing fatigue loads of key components of the wind turbine and the vibration level at one or more accelerometers. Hence, fatigue loads, fatigue damages and other characteristic quantities can be derived based on an acceleration measurement. This transfer function may be established beforehand by simultaneous measurement of the structural loads on the components and the vibration levels at the reference wind turbine. After being established the transfer function enables a continuous calculation of fatigue loads on relevant components as well as cumulative fatigue damage incurred by them. The transfer function provides this as a function of the overall vibration level without the need for dedicated measurements at the components using strain gauges, specifically dedicated additional accelerometers, or other costly sensor subsystems.

Thus, the present method enables to reduce the sensors used at the operative wind turbine (third set of sensors) to a minimum in number and in sensor complexity. As a result, it is moreover easy to establish redundancy with backup instruments to ensure that the monitoring system is always operational. Also, with such a form of transfer function, the fatigue load can be calculated based on the transfer function values by immediately taking over the transfer function values without further advanced data analysis. In more detailed embodiments, such as described below or in the detailed example, additional signal processing may be performed. Since the transfer function values can be calculated in a rather straightforward manner on the basis of the established transfer function, calculation complexity is reduced.

The invention can be embodied as provided in the claims and/or as given in the detailed embodiment.

In embodiments of the method, calculating the fatigue load can be further based on the obtained at least one measurement value of the third sensor. By doing so, not only the calculated transfer function values are used for fatigue load calculation but also the actual measurement values obtained for the set of sensors at the operative wind turbine.

As mentioned above, the second sensor, or second set of sensors, may comprise strain gauges. Alternatively or at the same time, the first sensor, or first set of sensors, and the third sensor, or third set of sensors, may comprise an accelerometer. In embodiments, these accelerometers may be simple single- or two-axis accelerometers.

Embodiments of the method may further be characterized in that calculating the fatigue load comprises a step of signal processing of the calculated at least one transfer function value and/or a step of signal processing of the obtained at least one measurement value of the third sensor. By such additional signal processing, the specificity of the results provided by the present method may be increased. For instance, the signal processing may be made to comprise filtering to select specific frequencies. By doing so, the fatigue load can be calculated specifically for one or more components of the wind turbine.

In a similar manner such embodiments of the method may also comprise a step of frequency analysis in its signal processing, to determine a vibration energy content value at a frequency being characteristic of a specific component of the wind turbine (first wind turbine, operative wind turbine).

The method may be further implemented in that it further comprises a step of calculating a cumulative fatigue load and/or a cumulative fatigue damage based on the calculated fatigue load. Thus, the total fatigue load or damage that has occurred so far for the wind turbine or one of its components that has occurred hitherto can be calculated.

The calculated values for the fatigue load, and in particular the calculated cumulative fatigue load and/or cumulative fatigue damage, may profitably be used to control wind turbine operation. Hence, according to the claims, a method of fatigue load control of at least one operative wind turbine is based on the at least one fatigue load value determined according to the inventive method. In particular, the fatigue load control method may comprise the steps of calculating a cumulative fatigue load and/or a cumulative fatigue damage based on the calculated fatigue load and curtailing wind turbine operation depending on the calculated cumulative fatigue load and/or cumulative fatigue damage.

While this method of controlling a wind turbine shares the desirable technical effects of reliable fatigue load calculation with a reduced amount of technical effort for sensor equipment and calculation, it further allows to control wind turbine behaviour with respect to the fatigue load that occurs, or has occurred so far, for the wind turbine. By using this method of wind turbine control, safety redundancies in the design of the wind turbine structural elements can be further reduced while continuing to meet the required safety properties.

The invention according to the claims can be embodied as provided in the claims and/or as given in the detailed embodiment.

An embodiment of the method of controlling a wind turbine may be characterized in that it comprises the step of calculating a fatigue ratio $F_T$ at a point of time T, according to $$F_T = \frac{D_T \cdot L_0}{D_0 \cdot L_T}$$

wherein $D_T$ is the cumulative fatigue damage at T, $L_0$ is a design life parameter, $D_0$ is the design fatigue damage parameter, and $L_T$ is the operating time at T.

In this embodiment, the cumulative fatigue damage $D_T$, the design life $L_0$, the design fatigue damage $D_0$, and the operating time $L_T$ may each be an overall value reflecting the properties of the whole wind turbine, or may reflect an individual component of the wind turbine, or groups thereof.

Embodiments of the wind turbine control method may then curtail wind turbine operations while the fatigue ratio $F_T$ exceeds the value of 1. Thus, wind turbine operation is regulated as a function of the fatigue ratio. If the fatigue ratio at a given point in time is lower than, or equals to, 1, wind turbine operation may continue without limitation. However, if the fatigue ratio exceeds 1, wind turbine operation will be curtailed until the fatigue ratio is again equal to or lower than 1.

The invention according to the claims proposes a reference wind turbine for the method of present invention, comprising a first sensor, a second sensor, and a processing unit connected to the first and second sensor, characterized in that the processing unit is configured to:
 obtain at least one measurement value of the first sensor and at least one measurement value of the second sensor;
 calculate a transfer function that associates the obtained at least one measurement value of the first sensor to the obtained at least one measurement value of the second sensor;
 provide the transfer function for further use.

Thus, a reference wind turbine is provided that can be used with the method given above, and which produces the technical effects as explained with regard to the method. In particular, the reference wind turbine according to the claims is able to create the transfer function that will be used in the operative wind turbines. The reference wind turbine preferably shares the mechanical properties and construction features of the operative wind turbines and comprises both the first sensor, or first set of sensors, and the second sensor, or second set of sensors, that are necessary for calculating the transfer function. The processing unit of the reference wind turbine can also be configured to execute any of the steps of the present method and of its embodiments where applicable. In other words, the reference wind turbine may be at the same time an operative wind turbine. It may be part of a wind park comprising a number of operative wind turbines in addition to the operative reference wind turbine.

The invention according to the claims teaches a wind turbine for performing the inventive method of determining fatigue load or the inventive method of method of fatigue load control. The wind turbine comprises a sensor, and a processing unit, wherein:
 the processing unit comprises a transfer function associating at least one input measurement value to at least one strain value, the transfer function being obtained by use of a reference wind turbine;
 the processing unit is configured to obtain at least one measurement value of a sensor, wherein the sensor is located at the wind turbine, and wherein the sensor and the position of the sensor at the wind turbine matches the position of the first sensor at the reference wind turbine;
 the processing unit is further configured to calculate at least one transfer function value corresponding to the obtained at least one measurement value of the sensor;
 the processing unit is further configured to calculate the fatigue load based on the calculated transfer function value.

The reference wind turbine by the use of which the transfer function is obtained may, in particular, be an inventive reference wind turbine, i.e. a reference wind turbine with a processing unit being configured to calculate the transfer function. However, obtaining the measurement values by use of the reference wind turbine and calculating the transfer function elsewhere on the basis of the measurement values obtained by the reference wind turbine is also possible Thus, an operative wind turbine is provided that is suitable for operation with both the method of fatigue load calculation and the method of fatigue load control and that appropriately implements the respective method steps to be executed at the operative wind turbine.

Since the sensor, or sensors, and the transfer function are matched regarding the type and position of the sensor at the wind turbine, proper calculation of function values that correctly reflect the respective mechanical load and strain properties is provided. Generally, the position of the sensor or sensors of the operative wind turbine are preferably identical to the (first) set of sensors at the reference wind turbine with respect to number, type, and position at the wind turbine.

The invention according to the claims can be embodied as provided in the claims and/or as given in the detailed embodiment. In particular, the processing unit may further comprise a controller for fatigue load control on the basis of the inventive fatigue load control method claimed. The controller may be configured to curtail wind turbine operation depending on the calculated cumulative fatigue load and/or cumulative fatigue damage.

The processing units, control modules, and components thereof may be configured to execute the steps of any of the methods and its embodiments by appropriate programming, and any combination of functional hardware and software components.

BRIEF DESCRIPTION OF THE DRAWINGS

The invention will be described in more detail below, referring to the following figures.

DETAILED DESCRIPTION OF INVENTION

Figure 1:
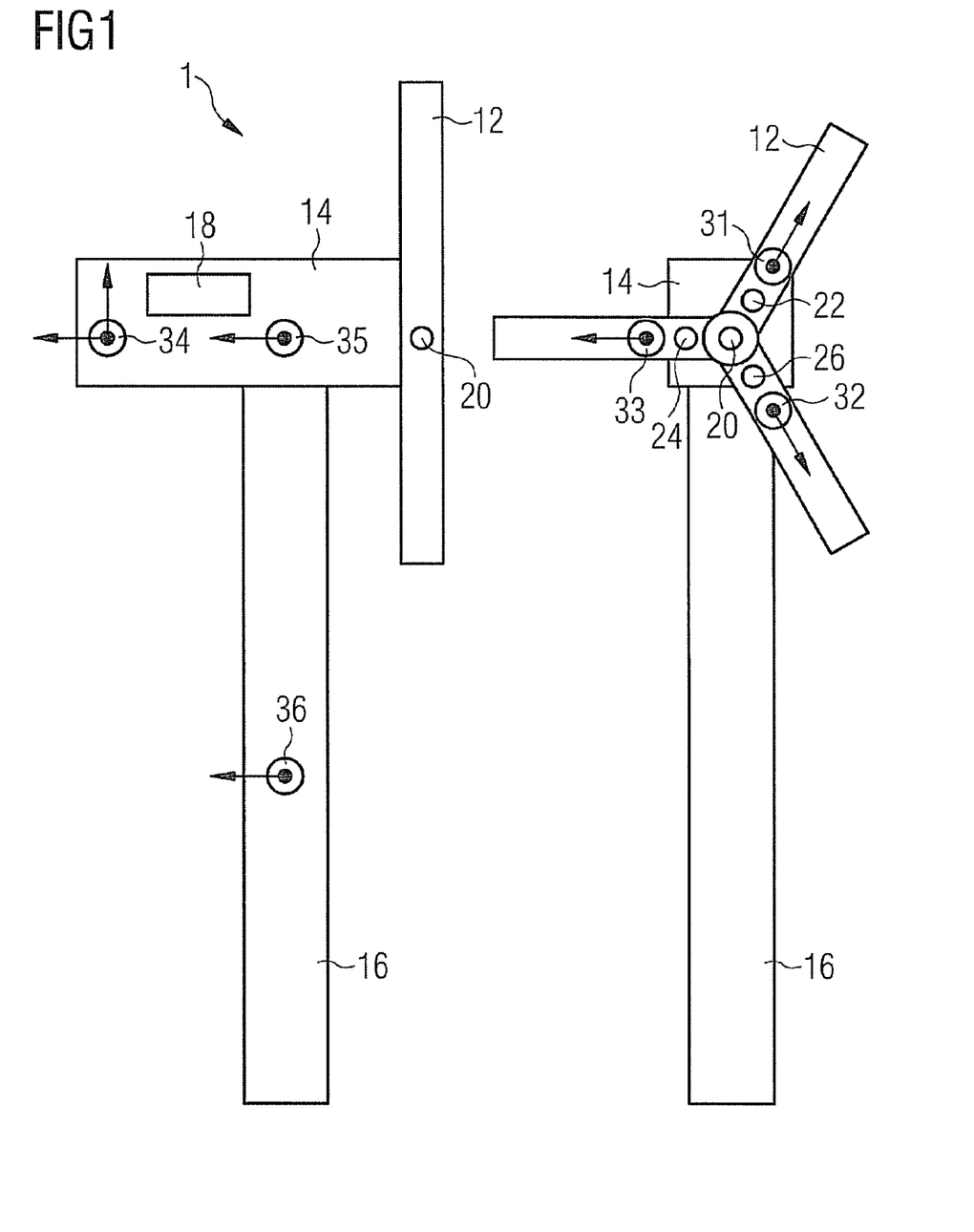
FIG. 1 a schematic overview of a reference wind turbine in both side view and front view.

FIG. 1 shows a schematic overview of an embodiment of the reference wind turbine. Reference wind turbine 1 is depicted in a side view on the left hand side of FIG. 1, and in a front view on the right hand side of FIG. 1. Reference wind turbine 1 comprises a rotor 12, a nacelle 14, a processing unit 18, and a wind turbine tower 16.

The rotor 12 is connected to nacelle 14 via a rotor hub (not shown) at the centre or rotor rotational axis of rotor 12 and the extension of the rotational axis in the nacelle 14. The nacelle 14 is mounted on top of the wind turbine tower 16.

In the present embodiment, processing unit 18 is located in the nacelle and is connected to various sensors and/or other devices throughout the wind turbine, as will be described in more detail below. Processing unit 18 may also be located in other parts of the wind turbine or in a separate processing device that may be connected with the wind turbine via a communication line.

A first set of sensors 31, 32, 33, 34, 35, and 36 is installed at the reference wind turbine 1. In the present embodiment, these sensors are accelerometers which are comparatively inexpensive, simple and robust. Sensors 31, 32, and 33 each are located at a blade centre of a rotor blade and measure acceleration or vibration in two dimensions (x y). Acceleration sensor 34 is located at the rear of nacelle 14 and measures accelerations in three dimensions (x y z). Sensor 35 is located at the centre of nacelle 14, and sensor 36 is located at the centre of the wind turbine tower 16. Both acceleration sensors 35 and 36 are two-dimensional sensors (x y). Preferably, the acceleration sensors are implemented such that the dimensions of measurements are orthogonal to each other.

Moreover, a second set of sensors 20, 22, 24, and 26 is located at the wind turbine rotor and the rotor hub. In the present embodiment, sensors 20, 22, 24, and 26 are strain gauges that measure the mechanical load that acts upon the wind turbine. However, these strain gauges require expertise to install and maintain and have a comparatively limited technical lifespan in relation to the accelerometers used for the first set of sensors 31 to 36.

Processing unit 18 is configured to obtain measurement values from the accelerometers 31 to 36 and the strain gauges 20 to 26 and to calculate a transfer function from these measurement values(accelerations and strains, respectively). The transfer function associates the accelerations measured by the accelerometers 31 to 36 to the strains measured by the strain gauges 20 to 26. The transfer function can be calculated by means of approximation or interpolation by implementing an appropriate numerical algorithm.

The processing unit 18 is further configured to provide the calculated transfer function for further use, for instance by allowing to retrieve the calculated transfer function from the processing unit by an external computing system or by the processing and/or control unit of an operative wind turbine that is connected to the processing unit of the reference wind turbine by a communication line (not shown).

Figure 2:
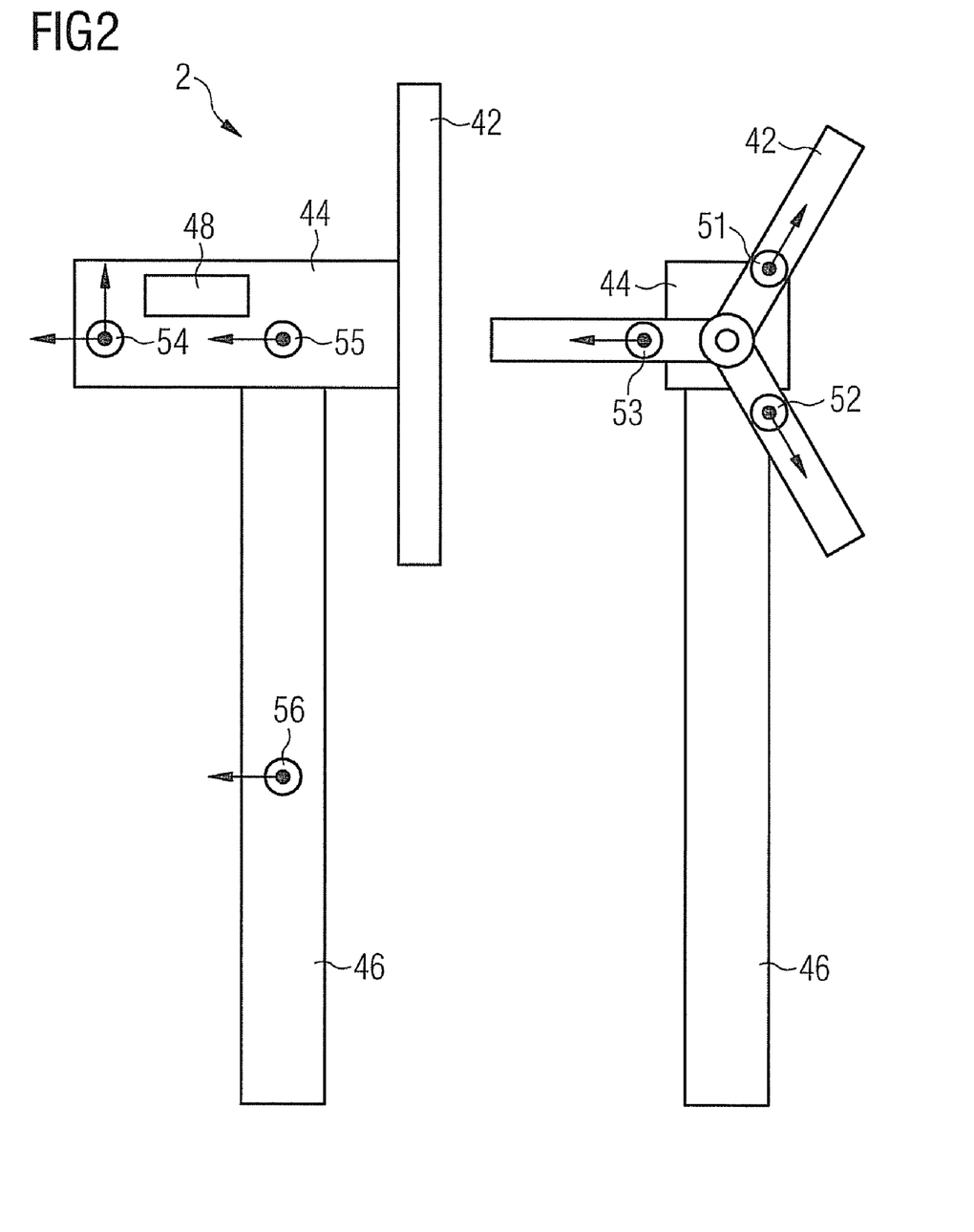
FIG. 2 a schematic overview of an operative wind turbine in both side view and front view.

FIG. 2 shows a schematic overview of an operative wind turbine 2. On the left hand side of FIG. 2, a side view of wind turbine 2 is given, and on the right hand side, a front view is given, as is shown for the reference wind turbine in FIG. 1.

Consequently, wind turbine rotor 42, wind turbine nacelle 44, and wind turbine tower 46 correspond to the rotor blade, nacelle, and tower of reference wind turbine 1.

In particular, the structural and mechanical properties of these components are approximately identical for the reference wind turbine and the operative wind turbine. Thus, the mechanical response and, in particular, the fatigue, of the operative wind turbine 2 is the same as of the reference wind turbine 1.

Operative wind turbine 2 comprises a set of sensors 51 to 56. Sensors 51 t o 56 are of the same type, and are located at the same position on wind turbine 2 as the first set of sensors 31 to 36 at reference wind turbine 1. Hence, in the present embodiment, the sensors of the third set of sensors 51 to 56 are accelerometers. In the present embodiment of the operative wind turbine 2, no strain gauges are present that would correspond to the second set of sensors 20 to 24 in the reference wind turbine 1 of FIG. 1.

The processing and control unit 48 is implemented to apply the transfer function that has been previously calculated in the reference wind turbine according to the embodiment of the method as described later. Processing and control unit 48 obtains acceleration and/or vibration measurement signals from sensors 51 t o 56 and feeds these measurement values into the transfer function. By doing so, processing and control unit 48 calculates the strain values that would have been measured at the strain gauges as in reference wind turbine 1 as if those strain gauges were present.

Based on the strain values thus obtained, processing and control unit 48 calculates the fatigue load. In particular, the fatigue load can be directly derived from the strain values calculated with help of the transfer function. In the present embodiment, however, additional signal processing is performed, as will be described in more detail with regard to the method steps which further are executed by processing and control unit 48, as will be described below.

In the present embodiment, processing and control unit 48 calculates a fatigue ratio based on the calculated fatigue load and further parameters, and curtails wind turbine performance when said fatigue ratio is an excess of a predefined value.

Details of the processing and control unit 48 will be given with regard to functional components in FIG. 4 and the related description below.

Figure 3:
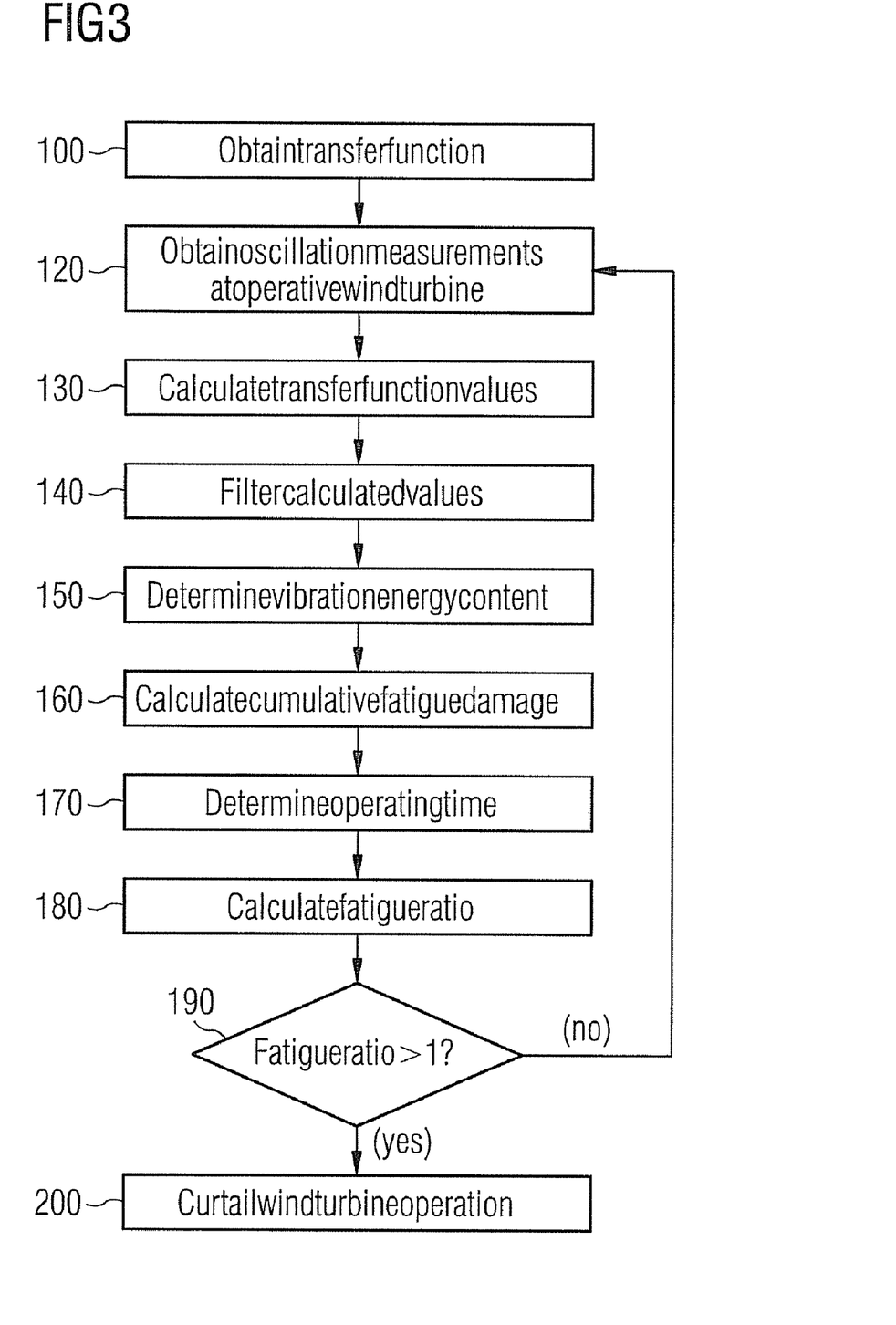
FIG. 3 a schematic overview of an embodiment of the method including both fatigue load calculation and wind turbine controller.

FIG. 3 shows a schematic overview of an embodiment of the method of present invention.

In step 100, processing and control unit 48 of the wind turbine 2 obtains a transfer function which is derived by use of measurements performed at a reference wind turbine, e.g. a reference wind turbine 1 as described with respect to FIG. 1.

The transfer function, which is provided by use of measurements performed at the reference wind turbine, is used in a number of operative wind turbines 2. For example, the transfer function can be transferred from the processing unit by which it has been calculated to the processing and control units 48 of the operative wind turbines by means of communication via a communication line or by manually transferring the transfer function to the processing and control units 48 of the operative wind turbines 2. The latter case can be realized either at the freshly installed operative wind turbine or also at the production site.

In step 120, the processing and control unit 48 of operative wind turbine 2, or each of the operative wind turbines 2, obtain acceleration measurements representing oscillations from its accelerometers 51 to 56.

Then, in step 130, the processing and control unit 48 of operative wind turbine 2 feeds these oscillation measurements into the transfer function, and thus calculates strain values since the transfer function associates acceleration values like those measured by the third set of sensors 51 to 56 to strain values like those that would have been measured by a set of strain gauges like those strain gauge present in the reference wind turbine.

The processing and control unit 48 then performs a step 140 of filtering the calculated values stemming from the transfer function to select specific characteristic frequencies and thus monitor particularly critical structural components of the operative wind turbine and, at the same time, suppress unwanted noise to improve the quality of performance.

In step 150, the processing and control unit 48 determines the vibration energy content to more accurately represent the actual fatigue damage incurred at a specific component or the whole wind turbine.

Thus, a cumulative fatigue damage is calculated in step 160 by processing unit 48.

Since in the present embodiment, the operative wind turbine 2 is implemented to not only determine the fatigue load or fatigue damage of the wind turbine but also to adapt wind turbine performance according to the result thus obtained, further steps are performed by processing and control unit 48. To control wind turbine operation, the present embodiment makes use of a fatigue ratio.

The fatigue ratio for a given component, or the sum of components, is calculated as the cumulative fatigue damage incurred by the component multiplied with the design life of the component, and divided by the product of the total calculated fatigue damage that is allowable for the component during its design life, multiplied with the cumulative operating time of the component, as given by $$F_T = \frac{D_T \cdot L_0}{D_0 \cdot L_T},$$

wherein $F_T$ is the fatigue ratio at time T, $D_T$ is the cumulative fatigue damage incurred by the component at time T, $L_0$ is the design life of the component, $D_0$ is the design fatigue damage for the component, and $L_T$ is the operating time of the component at time T.

Before the processing and control unit 48 can calculate the fatigue ratio in step 180, it needs to obtain the relevant parameters as given above. Therefore, the processing unit retrieves from an internal memory the component design life parameter $L_0$ and the design fatigue damage parameter $D_0$ from an internal memory (step not shown) and then retrieves the current operating time for a specific component $L_T$ by calculating the time span between the current time and an installation date of the component or a dedicated component timing module.

In step 190, processing and control unit 48 determines if the fatigue ratio at the present time, or a given point in time, is lower than, or equals, 1, or if it exceeds the value of 1. If the fatigue ratio exceeds the value of 1, wind turbine operation is curtailed in step 200 by setting appropriate command parameters for subsequent wind turbine control mechanisms to start or stop the wind turbine, set a maximum speed of the wind turbine, and/or set a maximum power for the wind turbine.

If the fatigue ratio is below or equal to 1, the wind turbine is allowed to operate normally.

In addition to the simplified view given in FIG. 3, curtailing of the wind turbine operation is stopped as soon as a fatigue ratio that has been in excess of 1 again reaches a value of 1 or even falls below the value of 1. For this, in an additional step following step 190 in case of the fatigue ratio not being greater than 1, the processing and control unit 48 determines if the wind turbine operation is presently curtailed, and discontinues the curtailing if so.

Figure 4:
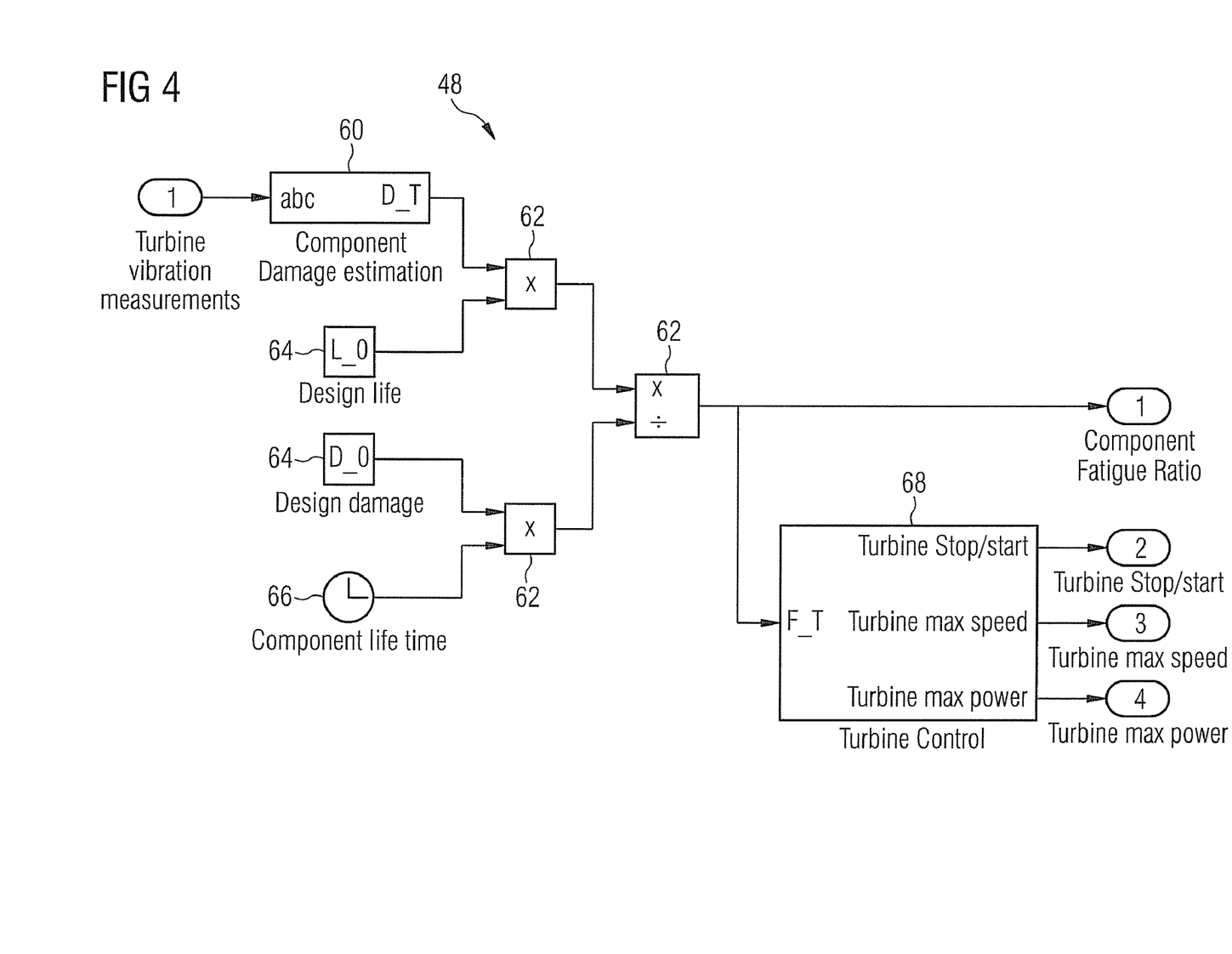
FIG. 4 a schematic overview of the processing unit/control module used in the operative wind turbine of FIG. 2.

FIG. 4 gives a more detailed schematic view of functional components of the processing and control unit 48 in the operative wind turbine 2. Damage estimation component 60 is configured to obtain the oscillation measurements at the operative wind turbine as described with regard to step 120 of the embodiment of the method shown in FIG. 3, and further to calculate the transfer function values in step 130, filter the calculated values in step 140, determine the vibration energy content in step 150, calculate the cumulative fatigue damage in step 160. Arithmetic-logical components 62 then receive and process the parameters $D_T$, $L_0$, $D_0$, and $L_T$ as specified in the formula for the calculation of the fatigue ratio $F_T$ in order to calculate $F_T$ and provide it to the turbine control sub system 68.

For doing so, arithmetic-logical units 62 receive the cumulative fatigue damage from component damage estimation 60, the operating time of the component at the present time from lifetime determining component 66, and the component design life parameter and the component design damage parameter from storage units 64.

Turbine control subsystem 68 performs the check if the fatigue ratio exceeds the value of 1 and sets the necessary parameters for effecting the curtailing of the wind turbine operation by appropriately setting a turbine start or stop parameter, a turbine maximum speed parameter, and/or a turbine maximum power parameter. As the person skilled in the art will acknowledge, these parameters will parameterize further wind turbine control mechanisms to adjust the actual wind turbine control to the desired settings.

In the manner described above, the present system thus allows to adapt wind turbine behaviour to the fatigue load and fatigue damage that has occurred to the wind turbine for the time period of its operation, and thus enables to reduce safety and stability overheads in the structural design of wind turbines. At the same time, the present system allows to reduce the number of sensors needed for such adaptive behaviour and also reduces the technical complexity of the sensors needed and the computational complexity as compared to systems of the state of the art.

To summarize, the invention provides a method for determining fatigue load of a wind turbine and for fatigue load control. The method uses a first wind turbine and at least a second wind turbine. The first wind turbine is the reference wind turbine which is equipped with strain gauges (or other load measuring equipment) and accelerometers. Based on contemporary measurements of loads and accelerations performed at the reference wind turbine a transfer function between loads and accelerations is established by normal engineering analysis. By use of this transfer function it is then possible to "translate" accelerations into strains, i.e. loads. The transfer function is then build into a controller in a second wind turbine and this second wind turbine with local accelerometers is then controlled so as to keep the loads (derived from the local measured accelerations using the transfer function) below a beforehand chosen level. The loads do not need to be instant loads but can also be average loads.

Note, that the first wind turbine is not a part of what happens on the second wind turbine according to the inventive method apart from the "inheritance" of the transfer function. The second wind turbine can be in another continent and the first wind turbine might long ago have been taken down when the second wind turbine is erected or starts running.

Moreover, is not a precondition to the inventive method that the controller which calculates the transfer function is implemented in the first wind turbine. The first wind turbine may be only used to obtain the measurement values needed for defining the transfer function.

The invention claimed is:

1. A method of determining fatigue load of an operative wind turbine, comprising:
   obtaining a measurement value of a first sensor and a measurement value of a second sensor via a reference wind turbine at which the first sensor and the second sensor are located;
   providing a transfer function that associates the obtained measurement value of the first sensor to the obtained measurement value of the second sensor;
   obtaining a measurement value of a third sensor, wherein the third sensor is located at the operative wind turbine, and wherein the third sensor corresponds in type and position to the first sensor at the reference wind turbine;
   calculating a transfer function value corresponding to the obtained measurement value of the third sensor via the provided transfer function; and
   calculating a fatigue load of the operative wind turbine based on the calculated transfer function value.

2. The method according to claim 1, wherein the calculated fatigue load is further based on the obtained measurement value of the third sensor.

3. The method according to claim 2, wherein the second sensor comprises a strain gauge.

4. The method according to claim 3, characterized in that the first sensor and the third sensor each comprises an accelerometer.

5. The method according to claim 4, wherein the calculated fatigue load further comprises
   signal processing the calculated transfer function value, and/or
   signal processing the obtained measurement value of the third sensor.

6. The method according to claim 5, wherein the signal processing comprises filtering to select specific frequencies.

7. The method according to claim 6, wherein the signal processing comprises frequency analysis to determine a vibration energy content value at a frequency characteristic of a specific component of the at least one operative wind turbine.

8. The method according to claim 7, further comprising
   calculating a cumulative fatigue load and/or a cumulative fatigue damage based on the calculated fatigue load.

9. A method of fatigue load control of at least one operative wind turbine, comprising:
   obtaining a measurement value of a first sensor and a measurement value of a second sensor via a reference wind turbine at which the first sensor and the second sensor are located;
   providing a transfer function that associates the obtained measurement value of the first sensor to the obtained measurement value of the second sensor;
   obtaining a measurement value of a third sensor, wherein the third sensor is located at the operative wind turbine, and wherein the third sensor corresponds in type and position to the first sensor at the reference wind turbine;
   calculating a transfer function value corresponding to the obtained measurement value of the third sensor via the provided transfer function;
   calculating a fatigue load of the operative wind turbine based on the calculated transfer function value wherein the calculated fatigue load further comprises
      signal processing the calculated transfer function value, and/or
      signal processing the obtained measurement value of the third sensor,
   wherein the signal processing comprises frequency analysis to determine a vibration energy content value at a frequency characteristic of a specific component of the at least one operative wind turbine; and
   curtailing wind turbine operation depending on at least one fatigue load value.

10. The method of fatigue load control as claimed in claim 9, further comprising calculating a cumulative fatigue load and/or a cumulative fatigue damage based on the calculated fatigue load, and the wind turbine operation is curtailed depending on the calculated cumulative fatigue load and/or cumulative fatigue damage.

11. The method of claim 10, further comprising calculating a fatigue ratio FT at a point of time T, according to:

$$F_T = \frac{D_T \cdot L_0}{D_0 \cdot L_T}$$

wherein
   DT is the cumulative fatigue damage at T,
   LO is a design life parameter,
   DO is the design fatigue damage parameter, and
   LT is the operating time at T.

12. The method of claim 11, wherein the wind turbine operation is curtailed while FT>1.

13. A reference wind turbine for determining fatigue load of an operative wind turbine, comprising:
   a first sensor arranged on the turbine;
   a second sensor arranged on the turbine; and
   a processing unit connected to the first and second sensors, the processing unit configured to:
      obtain at least one measurement value of the first sensor and at least one measurement value of the second sensor,
      calculate a transfer function that associates the obtained at least one measurement value of the first sensor to the obtained at least one measurement value of the second sensor, and
      provide the transfer function for further use.

14. A wind turbine, comprising:
   a sensor located at the wind turbine configured to provide at least one measurement value, wherein the sensor type and location at the wind turbine match a first sensor type and location at a reference wind turbine;
   a processing unit comprising a transfer function associating at least one input measurement value to at least one strain value, where the transfer function is obtained via the reference wind turbine, the processing unit configured to
      receive the at least one measurement value of the sensor,
      calculate at least one transfer function value corresponding to the received at least one measurement value of the sensor, and
      calculate a fatigue load based on the calculated transfer function value.

15. The wind turbine of claim 14, wherein the processing unit further comprises a controller configured for fatigue load control wherein the fatigue load control comprises:
   calculating a fatigue load of the operative wind turbine based on the calculated transfer function value wherein the calculated fatigue load further comprises
      signal processing the calculated transfer function value, and/or signal processing the obtained measurement value of the third sensor, wherein the signal processing comprises frequency analysis to determine a vibration energy content value at a frequency characteristic of a specific component of the wind turbine, and curtailing wind turbine operation depending on at least one fatigue load value.

* * * * *